United States Patent
Kim

(10) Patent No.: US 9,977,845 B2
(45) Date of Patent: May 22, 2018

(54) METHOD OF PERFORMING STATIC TIMING ANALYSIS FOR AN INTEGRATED CIRCUIT

(71) Applicant: SAMSUNG ELECTRONICS CO., LTD, Suwon-si, Gyeonggi-do (KR)

(72) Inventor: Moon-Su Kim, Gimpo-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 101 days.

(21) Appl. No.: 14/982,921

(22) Filed: Dec. 29, 2015

(65) Prior Publication Data

US 2016/0216316 A1     Jul. 28, 2016

(30) Foreign Application Priority Data

Jan. 22, 2015   (KR) .......................... 10-2015-0010681

(51) Int. Cl.
*G06F 17/50* (2006.01)

(52) U.S. Cl.
CPC .......... *G06F 17/50* (2013.01); *G06F 17/5022* (2013.01); *G06F 17/5031* (2013.01); *G06F 2217/84* (2013.01)

(58) Field of Classification Search
CPC .. G06F 17/50; G06F 17/5022; G06F 17/5031; G06F 2217/84
USPC ........................................ 716/100, 106, 108
See application file for complete search history.

(56) References Cited

U.S. PATENT DOCUMENTS

| | | | |
|---|---|---|---|
| 7,117,466 B2 | 10/2006 | Kalafala et al. | |
| 7,428,716 B2 | 9/2008 | Visweswariah | |
| 7,882,471 B1 | 2/2011 | Kariat et al. | |
| 7,992,114 B1 * | 8/2011 | Adams | G06F 17/5031 716/106 |
| 8,010,921 B2 | 8/2011 | Visweswariah | |
| 8,156,461 B2 | 4/2012 | Wakita et al. | |
| 8,160,858 B2 * | 4/2012 | Tseng | G06F 17/5036 703/13 |
| 8,204,730 B2 * | 6/2012 | Liu | G06F 17/5036 703/13 |
| 8,307,317 B2 * | 11/2012 | Adams | G06F 17/5031 716/113 |
| 8,407,640 B2 | 3/2013 | Le et al. | |
| 8,549,452 B2 * | 10/2013 | Banerji | G06F 17/5031 716/111 |
| 8,555,222 B2 | 10/2013 | Le et al. | |
| 8,707,233 B2 | 4/2014 | Foreman et al. | |

(Continued)

*Primary Examiner* — Stacy Whitmore
(74) *Attorney, Agent, or Firm* — F. Chau & Associates, LLC.

(57) ABSTRACT

A method of performing a static timing analysis on an integrated circuit includes loading a library that includes local random variation information of the integrated circuit and global variation information of the integrated circuit that is obtained based on a set of a plurality of global variation parameters of the integrated circuit, calculating delays of timing arcs included in the integrated circuit based on the library, and determining whether at least one timing path of a plurality of timing paths included in the integrated circuit violates a timing constraint based on the delays of the timing arcs in the at least one timing path, the local random variation information of the integrated circuit and the global variation information of the integrated circuit.

19 Claims, 13 Drawing Sheets

(56) References Cited

U.S. PATENT DOCUMENTS

| | | | | |
|---|---|---|---|---|
| 8,813,006 B1* | 8/2014 | Parameswaran | .... | G06F 17/5031 716/100 |
| 8,843,864 B2* | 9/2014 | Le | ....... | G06F 17/5031 703/19 |
| 9,619,609 B1* | 4/2017 | Bickford | ............. | G06F 17/5081 |
| 9,653,330 B1* | 5/2017 | Bickford | ................. | H01L 22/14 |
| 2004/0002844 A1 | 1/2004 | Jess et al. | | |
| 2007/0234256 A1* | 10/2007 | Chang | ................. | G06F 17/5031 716/113 |
| 2007/0277134 A1* | 11/2007 | Zhang | ................. | G06F 17/5031 716/113 |
| 2008/0133202 A1* | 6/2008 | Tseng | ................. | G06F 17/5036 703/14 |
| 2009/0031268 A1* | 1/2009 | Miranda | ............. | G06F 17/5031 716/113 |
| 2009/0306953 A1* | 12/2009 | Liu | ..................... | G06F 17/5036 703/14 |
| 2010/0211922 A1* | 8/2010 | Sinha | ................. | G06F 17/5031 716/108 |
| 2011/0087478 A1* | 4/2011 | Tseng | ................. | G06F 17/5036 703/14 |
| 2011/0289465 A1* | 11/2011 | Adams | ................ | G06F 17/5031 716/113 |
| 2012/0072880 A1* | 3/2012 | Le | ....... | G06F 17/5031 716/113 |
| 2013/0179851 A1* | 7/2013 | Le | ....... | G06F 17/5031 716/108 |
| 2014/0047403 A1* | 2/2014 | Le | ....... | G06F 17/5031 716/108 |

* cited by examiner

`
`
` corner_sigma(timing_index_slew_load_7x7) {
    corner_name: SS      ~—610
    index_1("0.005, 0.01, 0.5")  ~—620
    index_2("0.001, 0.01, 0.2")  ~—630
    values("0.03, 0.05, 0.10, ₩
            0.06, 0.10, 0.15, ₩ ~—650
            0.09, 0.15, 0.20 )
} corner_sigma(timing_index_slew_load_7x7) {
    corner_name: FF      ~—690
    index_1("0.005, 0.01, 0.5")  ~—660
    index_2("0.001, 0.01, 0.2")  ~—670
    values("-0.03, -0.05, -0.10, ₩
           -0.06, -0.10, -0.15, ₩ ~—680
           -0.09, -0.15, -0.20 )
}

`
`
`
```

(HOLD) SLACK CALCULATION BY GBA

SLACK_WGVAR = DPATH@FF − CPATH@SS
TOT_LVAR = RSS ( N∗LRD, N∗LRC)
SLACK BY GBA = SLACK_WGVAR − TOT_LVAR

SLACK CALCULATION BY PBA

LOCAL RANDOM VARIATION = RSS(Lσ1, Lσ2, Lσ3, Lσ4)
WORST GLOBAL VARIATION = SLACK@NN − MIN(SLACK@CORNERS)
(WHERE CORNERS = {SS, FF, FS, SF, NN})
WORST TOTAL VARIATION = RSS(N∗LRV, M∗WGV)
SLACK BY PBA = NOMINAL SLACK − WORST TOTAL VARIATION

FIG. 13
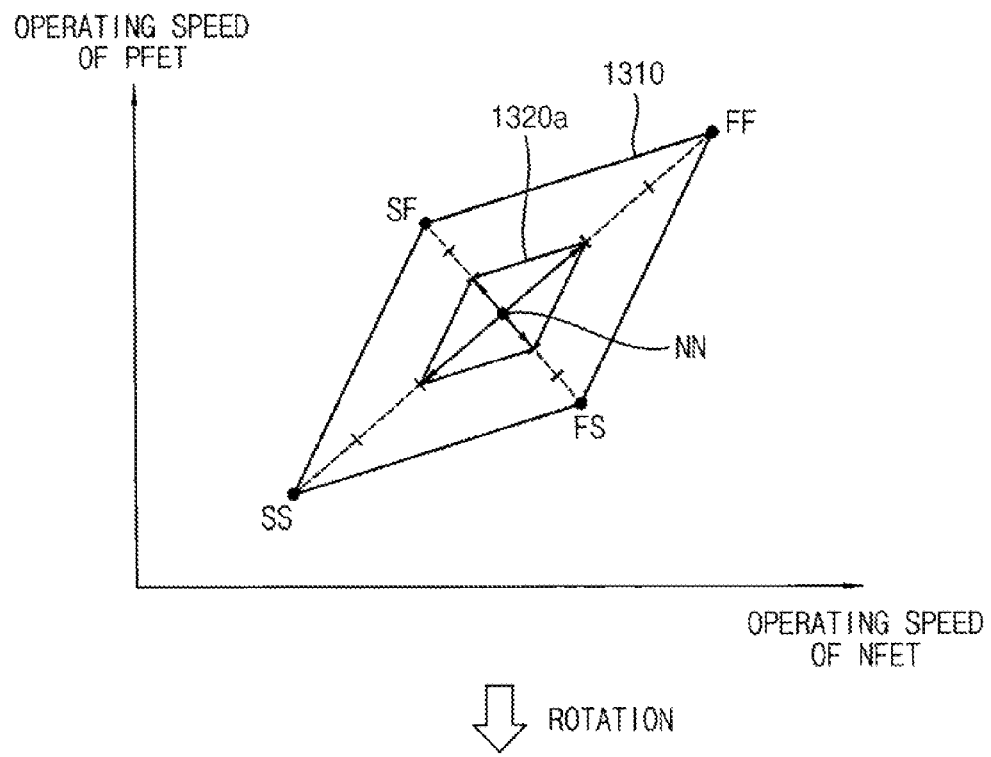
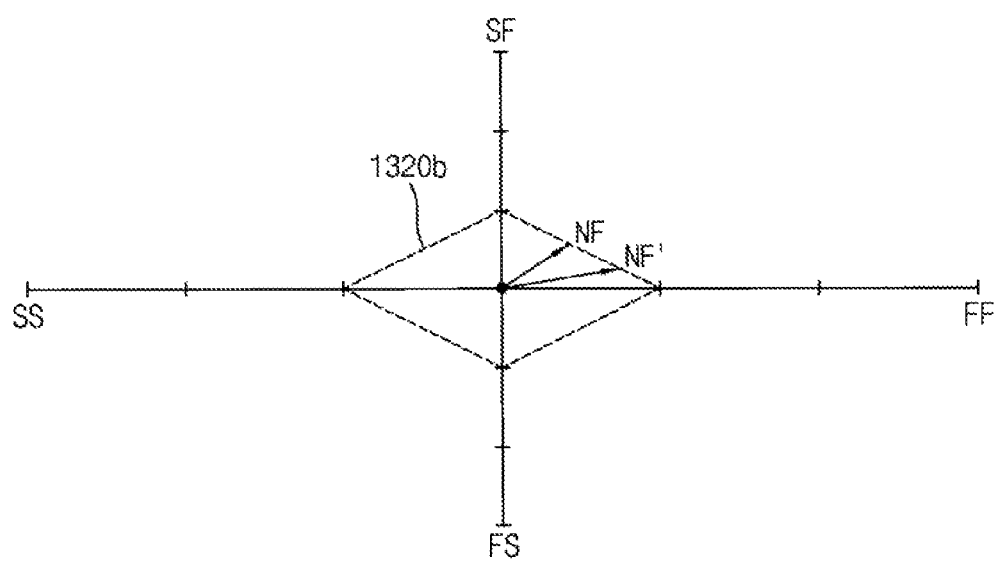
$$GV@NF = \tfrac{1}{2}(GV@SF + GV@FF)$$
$$GV@NF' = \tfrac{1}{2}(GV@NF + GV@FF)$$

METHOD OF PERFORMING STATIC TIMING ANALYSIS FOR AN INTEGRATED CIRCUIT

CROSS-REFERENCE TO RELATED APPLICATIONS

This U.S. non-provisional application claims priority under 35 U.S.C. § 119 from, and the benefit of, Korean Patent Application No. 10-2015-0010681 filed on Jan. 22, 2015 in the Korean Intellectual Property Office (KIPO), the contents of which are herein incorporated by reference in their entirety.

BACKGROUND

1. Technical Field

Exemplary embodiments are directed to semiconductor circuit designs, and more particularly, to methods of performing static timing analysis for integrated circuits.

2. Discussion of the Related Art

In designing an integrated circuit, such as a system-on-chip (SoC), static timing analysis (STA) is performed to analyze timings of the designed integrated circuit. This static timing analysis may reflect process variations in the step of designing the integrated circuit, thereby improving a yield of the integrated circuit. A widely used method of static timing analysis is a statistical static timing analysis (SSTA) that statistically reflects a probability distribution of timing or an operation speed of the integrated circuit. However, SSTA requires a long time for a library development and/or a static timing analysis, and thus is more or less unsuitable for a modern SoC development that needs a short time-to-market. Recently, a parameterized on-chip-variation (POCV) static timing analysis has been developed to reduce the time required for library development and/or the time required for static timing analysis. However, this POCV static timing analysis does not accurately reflect global variations in the timing analysis.

SUMMARY

Exemplary embodiments can provide a method of performing static timing analysis that reflects global variations of an integrated circuit.

According to exemplary embodiments, a method of performing a static timing analysis on an integrated circuit includes loading a library that includes local random variation information of the integrated circuit and global variation information of the integrated circuit that is obtained based on a set of a plurality of global variation parameters of the integrated circuit, calculating delays of timing arcs included in the integrated circuit based on the library, and determining whether at least one timing path of a plurality of timing paths included in the integrated circuit violates a timing constraint based on the delays of the timing arcs in the at least one timing path, the local random variation information of the integrated circuit and the global variation information of the integrated circuit.

In some exemplary embodiments, the global variation information of the library may include global variation values for at least two timing corners of the integrated circuit based on the set of the plurality of global variation parameters of the integrated circuit.

In some exemplary embodiments, determining whether the at least one timing path violates the timing constraint includes calculating a slack of the at least one timing path based on the delays of the timing arcs included in the at least one timing path and a statistical sum of a local random variation value of the at least one timing path and a global variation value of the at least one timing path.

In some exemplary embodiments, determining whether at least one timing path violates the timing constraint may include performing a graph based analysis (GBA) to extract a critical path from the plurality of timing paths included in the integrated circuit, and performing a path based analysis (PBA) to determine whether the critical path violates the timing constraint.

In some exemplary embodiments, performing the GBA may include calculating a local random variation value of the timing path by propagating a local random variation on each timing path, calculating a global random variation value of the timing path by propagating a global variation on each timing path, calculating a total random variation value of each timing path from a statistical sum of the local random variation value of each timing path and the global random variation value of each timing path, and determining whether a timing path is the critical path based on the delays of the timing arcs included in each timing path and the total random variation value of each timing path.

In some exemplary embodiments, the local random variation information may include local random variation values of the timing arcs. The local random variation value of each timing path may be calculated from a root-sum-square of the local random variation values of the timing arcs included in each timing path.

In some exemplary embodiments, the global variation information may include global variation values of the timing arcs. The global variation value of each timing path may be calculated from a linear sum of the global variation values of the timing arcs included in each timing path.

In some exemplary embodiments, one of the plurality of timing paths may include a data path and a clock path, and the global variation value of the one timing path may be calculated by applying the global variation values of the timing arcs at a fast corner of the integrated circuit with respect to one of the data path and the clock path, and by applying the global variation values of the timing arcs at a slow corner of the integrated circuit with respect to another one of the data path and the clock path.

In some exemplary embodiments, the statistical sum of the local random variation value of each timing path and the global random variation value of each timing path may be a root-sum-square of the local random variation value of each timing path and the global random variation value of each timing path.

In some exemplary embodiments, performing the PBA may include calculating a local random variation value of the critical path by calculating a root-sum-square of local random variation values of the timing arcs included in the critical path, calculating a worst global variation value of the critical path by calculating respective slacks of the critical path at a plurality of timing corners and a nominal corner of the integrated circuit, calculating a worst total variation of the critical path from a statistical sum of the local random variation value of the critical path and the worst global variation value of the critical path, and determining whether the critical path violates the timing constraint may be determined based on the delays of the timing arcs included in the critical path and the worst total variation of the critical path.

In some exemplary embodiments, calculating the worst global variation value of the critical path may include calculating the respective slacks of the critical path at the plurality of timing corners, selecting a minimum of the calculated slacks of the critical path, and calculating the worst global variation value of the critical path by subtracting the minimum of the calculated slacks of the critical path from a slack of the critical path at the nominal corner of the integrated circuit.

In some exemplary embodiments, determining whether the critical path violates the timing constraint may include calculating a worst slack of the critical path based on the delays of the timing arcs included in the critical path and the worst total variation of the critical path, and deciding that the critical path violates the timing constraint when the worst slack of the critical path has a negative value.

In some exemplary embodiments, calculating the worst global variation value of the critical path may include calculating global variation values of the critical path at the timing corners included in the global variation information, calculating a global variation value at at least one timing corner not included in the global variation information based on the global variation values of the critical path at at least two of the timing corners included in the global variation information, and selecting a maximum of the global variation values of the critical path at timing corners included in the global variation information and the global variation value at the timing corner not included in the global variation information as the worst global variation value of the critical path.

In some exemplary embodiments, the method may further include changing a nominal corner of the integrated circuit based on global variation values for at least two timing corners included in the global variation information, performing the graph based analysis (GBA) at the changed nominal corner, and performing the path based analysis (PBA) at the changed nominal corner.

According to exemplary embodiments, another method of performing a static timing analysis on an integrated circuit includes loading a library that includes local random variation information of the integrated circuit and global variation information of the integrated circuit that is obtained based on a set of a plurality of global variation parameters of the integrated circuit, performing a graph based analysis (GBA) to extract a critical path from a plurality of timing paths included in the integrated circuit based on the local random variation information and the global variation information, and performing a path based analysis (PBA) to determine whether the critical path violates a timing constraint.

In some exemplary embodiments, the method may further include characterizing a delay of each timing arc in each cell included in the integrated circuit, wherein the delays may be stored in the library; obtaining local random variation values of each timing arc in each cell included in the integrated circuit by performing a simulation by varying local random variation parameters with respect to transistors included in each timing arc; and obtaining global variation values of each timing arc in each cell included in the integrated circuit by varying a set of a plurality of global variation parameters for at least two timing corners of the integrated circuit in a simulation. The local random variation values and the global variation values of each timing arc in each cell may be stored in the library for the integrated circuit.

In some exemplary embodiments, performing the GBA may include calculating a local random variation value of each timing path included in the integrated circuit from a root-sum-square of local random variation values of timing arcs included in each timing path; calculating a global random variation value of each timing path included in the integrated circuit from a linear sum of global variation values of the timing arcs included in each timing path; calculating a total random variation value of each timing path included in the integrated circuit from a root-sum-square of the local random variation value of each timing path and the global random variation value of each timing path; and determining whether each timing path is the critical path based on the delays of the timing arcs included in each timing path and the total random variation value of each timing path.

In some exemplary embodiments, performing the PBA may include calculating a local random variation value of the critical path by calculating a root-sum-square of local random variation values of the timing arcs included in the critical path; calculating a worst global variation value of the critical path by subtracting a minimum of respective slacks of the critical path at a plurality of timing corners from a slack of the critical path at a nominal corner of the integrated circuit; calculating a worst total variation of the critical path from a statistical sum of the local random variation value of the critical path and the worst global variation value of the critical path; and determining whether the critical path violates the timing constraint based on the delays of the timing arcs included in the critical path and the worst total variation of the critical path.

According to exemplary embodiments, another method of performing a static timing analysis on an integrated circuit includes loading a library that includes local random variation information of the integrated circuit and global variation information of the integrated circuit that is obtained based on a set of a plurality of global variation parameters of the integrated circuit; calculating delays of timing arcs included in the integrated circuit based on the library; calculating a slack of a timing path included in the integrated circuit based on the delays of the timing arcs included in the timing path and a statistical sum of a local random variation value of the timing path and a global variation value of the timing path; and deciding that the timing path violates a timing constraint when the slack of the timing path has a negative value.

As described above, a method of performing a static timing analysis on an integrated circuit according to exemplary embodiments may use global variation information obtained based on a set of a plurality of global variation parameters of the integrated circuit, which may improve accuracy and coverage of the static timing analysis.

Further, in a method of performing a static timing analysis on an integrated circuit according to exemplary embodiments, the global variation information may be obtained or characterized based on the set of the plurality of global variation parameters, which may reduce the time required for library development and/or time required for the static timing analysis.

BRIEF DESCRIPTION OF THE DRAWINGS

FIG. 6 illustrates an example of a library that includes global variation information.

FIG. 13 illustrates an example where an uncharacterized global variation value is calculated based on a characterized global variation value.

DETAILED DESCRIPTION OF EXEMPLARY EMBODIMENTS

Figure 1:
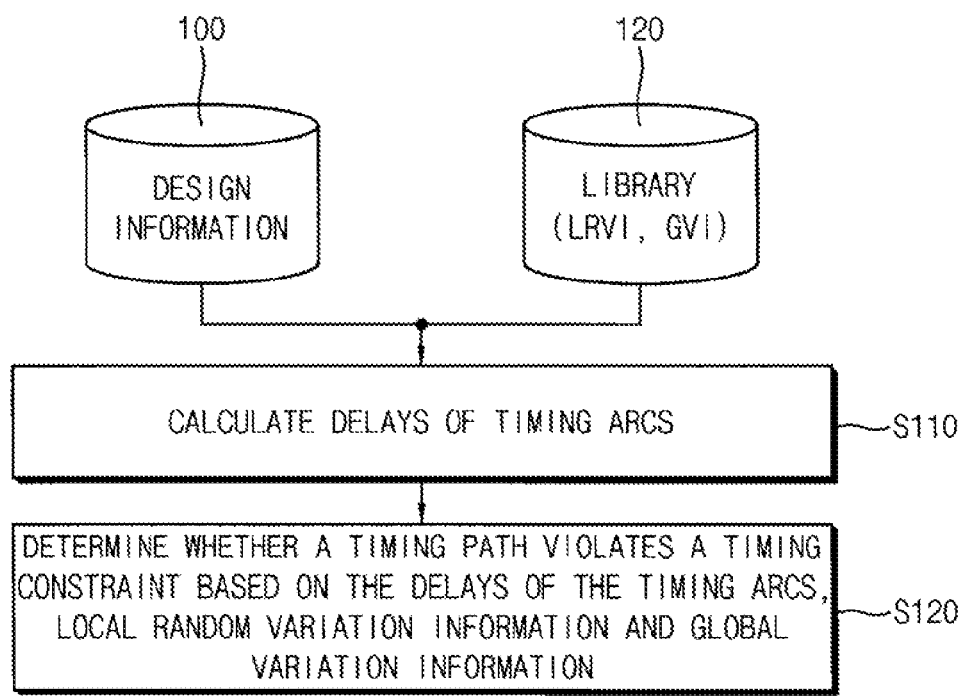
FIG. 1 is a flow chart that illustrates a method of performing a static timing analysis on an integrated circuit according to exemplary embodiments.

Various exemplary embodiments will be described more fully hereinafter with reference to the accompanying drawings, in which some exemplary embodiments are shown. The present inventive concept may, however, be embodied in many different forms and should not be construed as limited to the exemplary embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. Like numerals may refer to like elements throughout.

Figure 2:
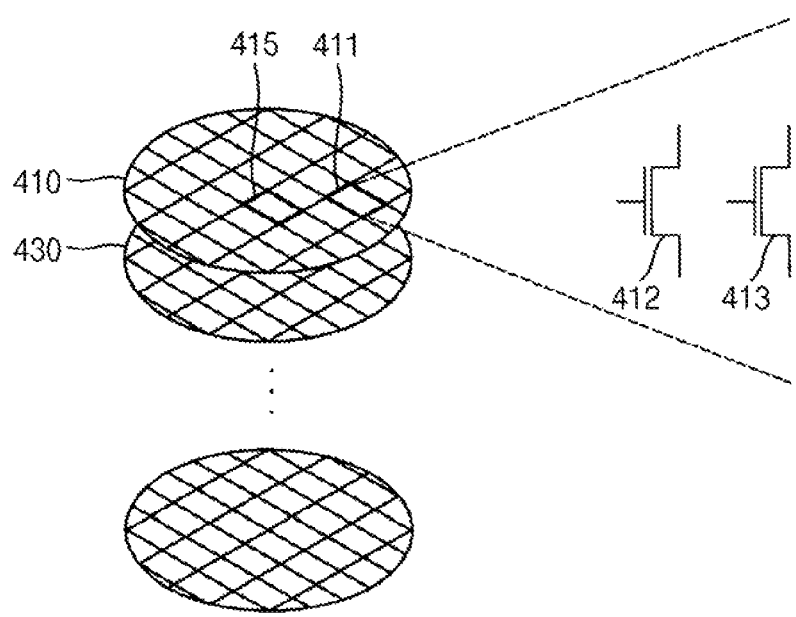
FIG. 2 illustrates a global variation and a local random variation.
Figure 3A:
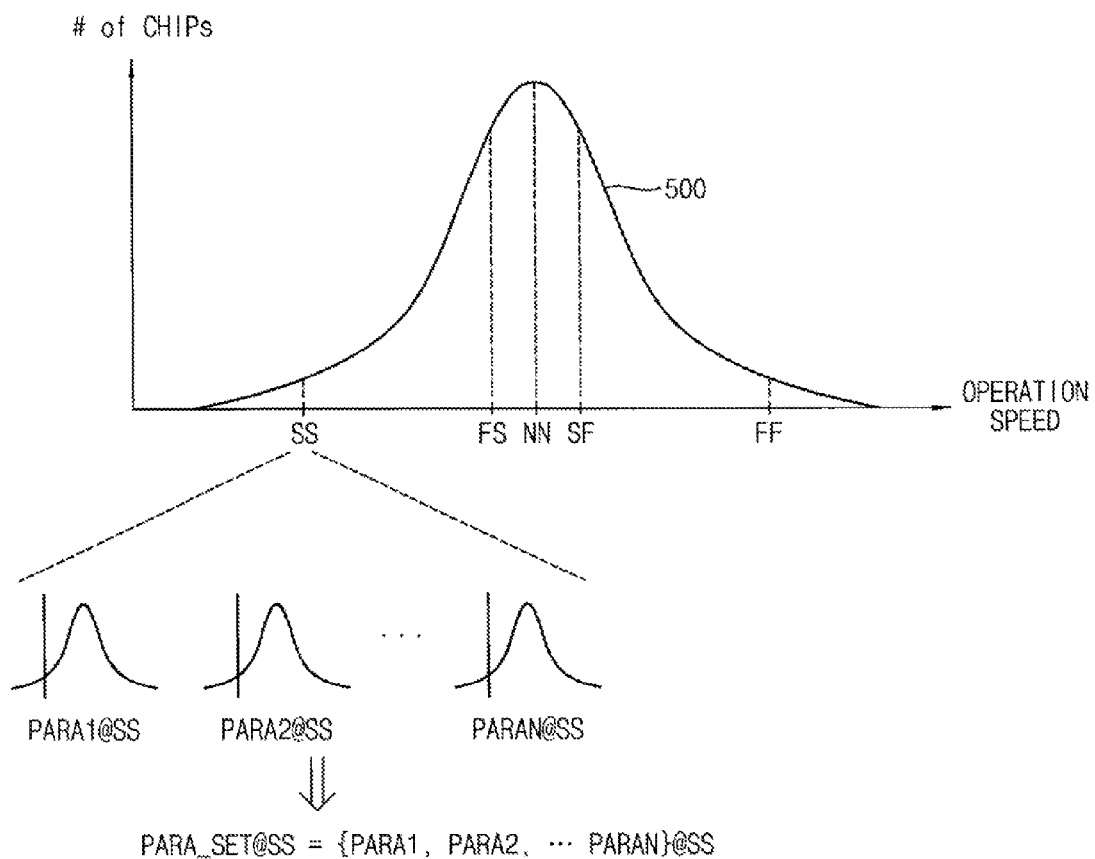
FIG. 3A illustrates a distribution of an integrated circuit according to an operating speed of the integrated circuit.
Figure 3B:
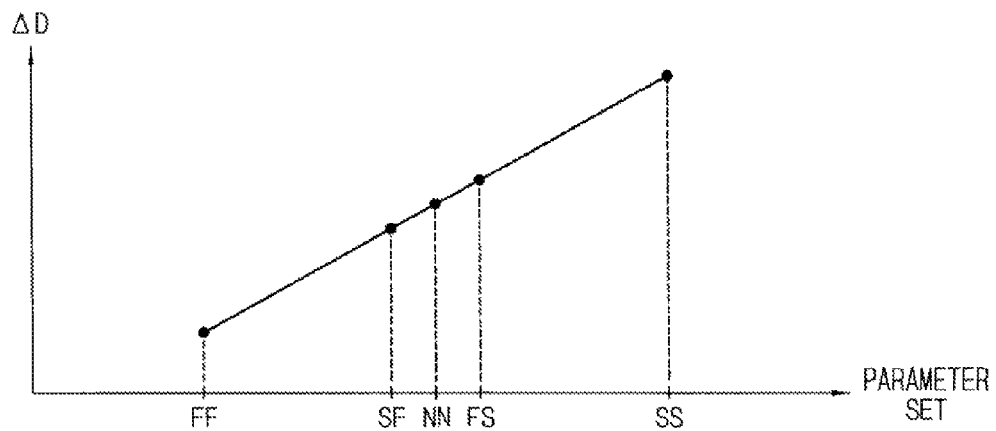
FIG. 3B illustrates a delta delay according to a set of global variation parameters.

FIG. 1 is a flow chart that illustrates a method of performing a static timing analysis on an integrated circuit according to exemplary embodiments, FIG. 2 illustrates a global variation and a local random variation, FIG. 3A illustrates a distribution of an integrated circuit according to an operating speed of the integrated circuit, and FIG. 3B illustrates a delta delay according to a set of global variation parameters.

Referring to FIG. 1, in a method of performing a static timing analysis on an integrated circuit, design information 100 for the integrated circuit and a library 120 for the integrated circuit are loaded. The design information 100 for the integrated circuit may include types of cells, such as standard cells, included in the integrated circuit and a netlist representing connection relationship between the cells. For example, the netlist may be described in a hardware description language (HDL). In some exemplary embodiments, the design information 100 for the integrated circuit may further include parasitic data information, such as standard parasitic exchange format (SPEF) information, that represents resistances, capacitances and inductances of wirings included in the integrated circuit, and/or design constraint information, such as Synopsys design constraint (SDC) information, that represents timing constraints required by the integrated circuit.

The library 120 of the integrated circuit may include local random variation information LRVI and global variation information GVI for the cells, or timing arcs of the cells, included in the integrated circuit. In some exemplary embodiments, the library 120 of the integrated circuit may further include delay information, function definitions, power information, noise information, etc., for the cells.

The local random variation information LRVI of the library 120 may include local random variation values of the timing arcs of the cells included in the integrated circuit, and the global variation information GVI may include global variation values of the global variation information GVI. Here, the local random variation may be a variation, such as a delay variation, between timing arcs or transistors within the integrated circuit. In an example illustrated in FIG. 2, the local random variation may be a variation between transistors 412 and 413 included in one integrated circuit 411. Further, the global variation may be a variation between different integrated circuits 411 and 415 within the same wafer 410, or a variation between different wafers 410 and 430.

The local random variation information LRVI or the local random variation values in the library 120 may be obtained or characterized by performing a simulation by varying local random variation parameters with respect to transistors included in each timing arc. For example, a simulation can be performed using a characterization tool, such as Silicon Smart of Synopsys, Altos of Cadence, etc. In some exemplary embodiments, the local random variation information LRVI can be obtained or characterized in a manner substantially the same as that employed in a typical parameterized on-chip-variation (POCV) static timing analysis.

The global variation information GVI or the global variation values in the library 120 may be obtained or characterized based on a set of a plurality of global variation parameters of the integrated circuit. For example, the global variation information GVI of the library 120 can be obtained or characterized based on the set of the global variation parameters at at least two timing corners of the integrated circuit. Although a plurality of integrated circuits can be manufactured by a same process, the integrated circuits can have an operating speed distribution 500 as illustrated in FIG. 3A due to process variations, or to global variations. In a method according to exemplary embodiments, the global variation information GVI of the library 120 can be obtained or characterized for at least two timing corners, such as a slow corner SS and a fast corner FF, or the slow corner SS, the fast corner FF and skewed corners SF and FS.

In a conventional statistical static timing analysis (SSTA), a simulation is performed a number of times by varying respective global variation parameters PARA1, PARA2, ..., PARAN to obtain or characterize the global variation values according to the respective global variation parameters PARA1, PARA2, ..., PARAN with respect to each timing arc. However, in a method according to exemplary embodiments, the plurality of global variation parameters PARA1, PARA2, ..., PARAN are treated as one parameter set PARA_SET, which can reduce the time required for the global variation characterization. For example, to obtain or characterize the global variation information GVI at the slow corner SS and the fast corner FF, a simulation can be performed using a set PARA_SET@SS of the plurality of global variation parameters PARA1, PARA2, ..., PARAN at the slow corner SS, and another simulation can be performed using a set of the plurality of global variation parameters PARA1, PARA2, . . . , PARAN at the fast corner FF. For example, as illustrated in FIG. 3B, with respect to each timing arc, a delta delay ΔD, such as a delay difference with respect to a nominal corner NN, according to the parameter set PARA_SET at the fast corner FF can be characterized, the delta delay ΔD according to the parameter set PARA_SET at the slow corner SS can be characterized, the delta delay ΔD according to the parameter set PARA_SET at a first skewed corner FS can be characterized, and the delta delay ΔD according to the parameter set PARA_SET at a second skewed corner SF can be characterized to obtain the global variation information GVI of the library 120. That is, in a method according to exemplary embodiments, unlike a conventional SSTA that performs the simulation a number of times by varying the respective parameters PARA1, PARA2, . . . , PARAN, the simulation is performed by varying the parameter set PARA_SET or of all parameters PARA1, PARA2, . . . , PARAN corresponding to the timing corners, such as the slow and fast corners SS and FF, or the slow, fast and skewed corners SS, FF, FS and FF. Accordingly, the time required for the global variation characterization may be reduced, and thus a library characterization time or a library development time may be reduced.

Delays of the timing arcs included in the integrated circuit can be calculated based on the loaded library 120 (S110), and whether at least one timing path included in the integrated circuit violates the timing constraint for the integrated circuit can be determined based on the delays of the timing arcs, the local random variation information LRVI and the global variation information GVI (S120). In some exemplary embodiments, whether the timing path violates the timing constraint can be determined by calculating a slack of the timing path based on the delays of the timing arcs, and a statistical sum of the local random variation value of the timing path and the global variation value of the timing path. For example, if the slack of the timing path has a negative value, it is decided that the timing path violates the timing constraint.

In a conventional POCV statistical timing analysis, the global variation is not accurately reflected. However, in a method of performing static timing analysis according to exemplary embodiments, the library 120 of the integrated circuit can include not only the local random variation information LRVI but also the global variation information GVI, and the static timing analysis is performed based on not only the local random variation information LRVI but also the global variation information GVI. Accordingly, accuracy and coverage of the static timing analysis may be improved.

As described above, in a method of performing static timing analysis according to exemplary embodiments, the global variation information GVI can be obtained or characterized based on a set of a plurality of global variation parameters, and thus the time required for library development and/or the time required for static timing analysis may be reduced. Further, in the method of performing the static timing analysis according to exemplary embodiments, using the global variation information GVI obtained based on the set of the plurality of global variation parameters to perform the static timing analysis may improve the accuracy and coverage of the static timing analysis.

Figure 4:
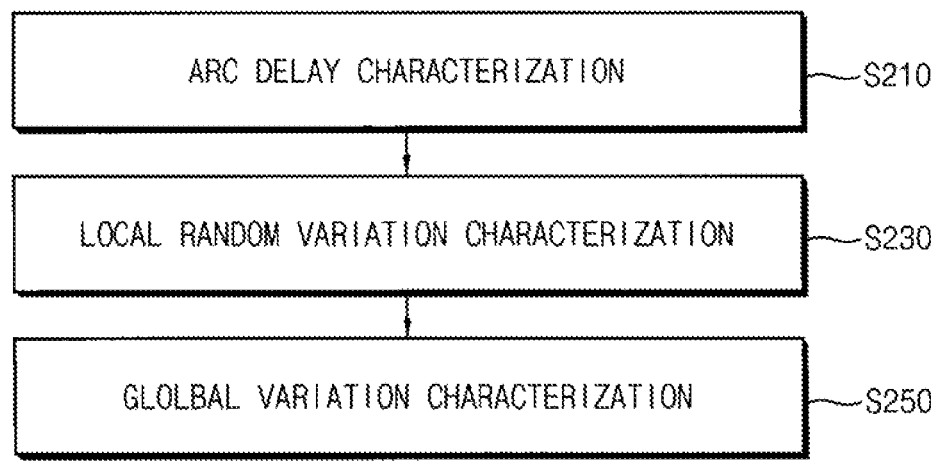
FIG. 4 is a flow chart that illustrates a method of characterizing a library according to exemplary embodiments.
Figure 5:
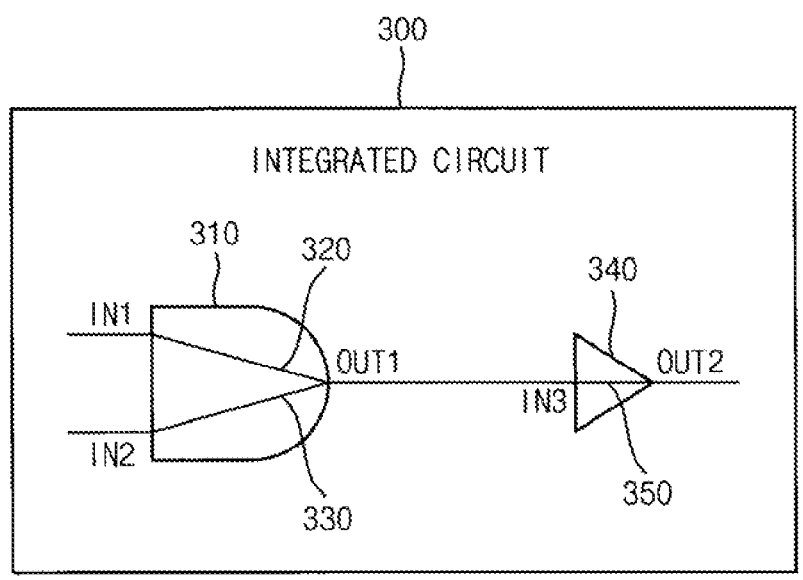
FIG. 5 illustrates timing arcs included in an integrated circuit.

FIG. 4 is a flow chart that illustrates a method of characterizing a library according to exemplary embodiments, FIG. 5 illustrates timing arcs included in an integrated circuit, and FIG. 6 illustrates an example of a library that includes global variation information.

Referring to FIG. 4, to perform a library characterization, a delay of each timing arc in each cell included in an integrated circuit is characterized (S210). The integrated circuit may include various cells, such as an inverter, a buffer, a NAND gate, an AND gate, a NOR gate, an OR gate, an XOR gate, an XNOR gate, a multiplexer, an adder, a latch, a flip-flop, etc., and delays of each timing arc in each of these cells according to input slews and output loads can be obtained or characterized using a characterization tool, such as Silicon Smart of Synopsys, Altos of Cadence, etc. In an example illustrated in FIG. 5, an integrated circuit 300 includes an AND gate 310 and a buffer 340, the AND gate 310 has a first timing arc 320 between a first input IN1 and a first output OUT1 and a second timing arc 330 between a second input IN2 and the first output OUT1, and the buffer 340 has a third timing arc 350 between a third input IN3 and a second output OUT2. By using the characterization tool, nominal delays of the first through third timing arcs 320, 330 and 350 according to the input slews and the output loads can be obtained. The nominal delays of each timing arc in each cell can be written into a library for the integrated circuit.

Local random variation values of each timing arc in each cell included in the integrated circuit are characterized (S230). For example, by using the characterization tool, the local random variation values of the timing arc can be obtained by performing a simulation by varying local random variation parameters with respect to transistors included in the timing arc. In some exemplary embodiments, these local random variation values can be obtained or characterized in a manner substantially the same as that employed in a typical parameterized on-chip-variation (POCV) static timing analysis. The local random variation values of each timing arc in each cell can be written into the library for the integrated circuit. In some exemplary embodiments, the local random variation values in the library may be scaled to a 1-sigma standard deviation level.

Global variation values of each timing arc in each cell included in the integrated circuit are characterized (S250). The global variation values can be obtained or characterized based on a set of a plurality of global variation parameters for at least two timing corners of the integrated circuit. In some exemplary embodiments, the global variation values can be obtained or characterized at a slow corner SS and a fast corner FF. For example, to characterize the global variation values at a slow corner SS according to the input slews and the output loads, a simulation can be performed by applying the set of the global variation parameters at the slow corner SS to the characterization tool. Further, to characterize the global variation values at a fast corner FF according to the input slews and the output loads, a simulation can be performed by applying the set of the global variation parameters at the fast corner FF to the characterization tool. The global variation values of each timing arc in each cell can be written into the library for the integrated circuit. In some exemplary embodiments, the global variation values in the library are scaled to a 1-sigma standard deviation level. For example, if the slow corner SS and the fast corner FF have a 3-sigma standard deviation level in a distribution 500 as illustrated in FIG. 3A, the global variation values characterized at the slow corner SS and the fast corner FF are divided by 3, and the divided values are written in the library.

For example, as illustrated in FIG. 6, a library 600 includes global variation values for each timing arc. That is, the library 600 includes, for each timing arc, a direction, such as a timing corner at which the global variation is characterized, of the global variation, input slew indexes, output load indexes and the global variation values. For example, the library 600 includes the global variation values 650 respectively corresponding to combinations of the input slew indexes 620 and the output load indexes 630 at the slow corner (SS) 610, and the global variation values 680 respectively corresponding to combinations of the input slew indexes 660 and the output load indexes 670 at the fast corner (FF) 690. Although FIG. 6 illustrates an example of the library 600 where the global variation is characterized at a slow corner SS and a fast corner FF, in some exemplary embodiments, the global variation may be further characterized at other timing corners, such as an SF corner and an FS corner.

In a conventional SSTA, a simulation is performed a number of times by varying respective global variation parameters. However, in a method of characterizing a library according to exemplary embodiments, the global variation can be characterized by varying the set of the global variation parameters or of all global variation parameters, and thus the time required to characterize global variations may be reduced. Accordingly, the library characterization time or the library development time may be reduced.

Figure 7:
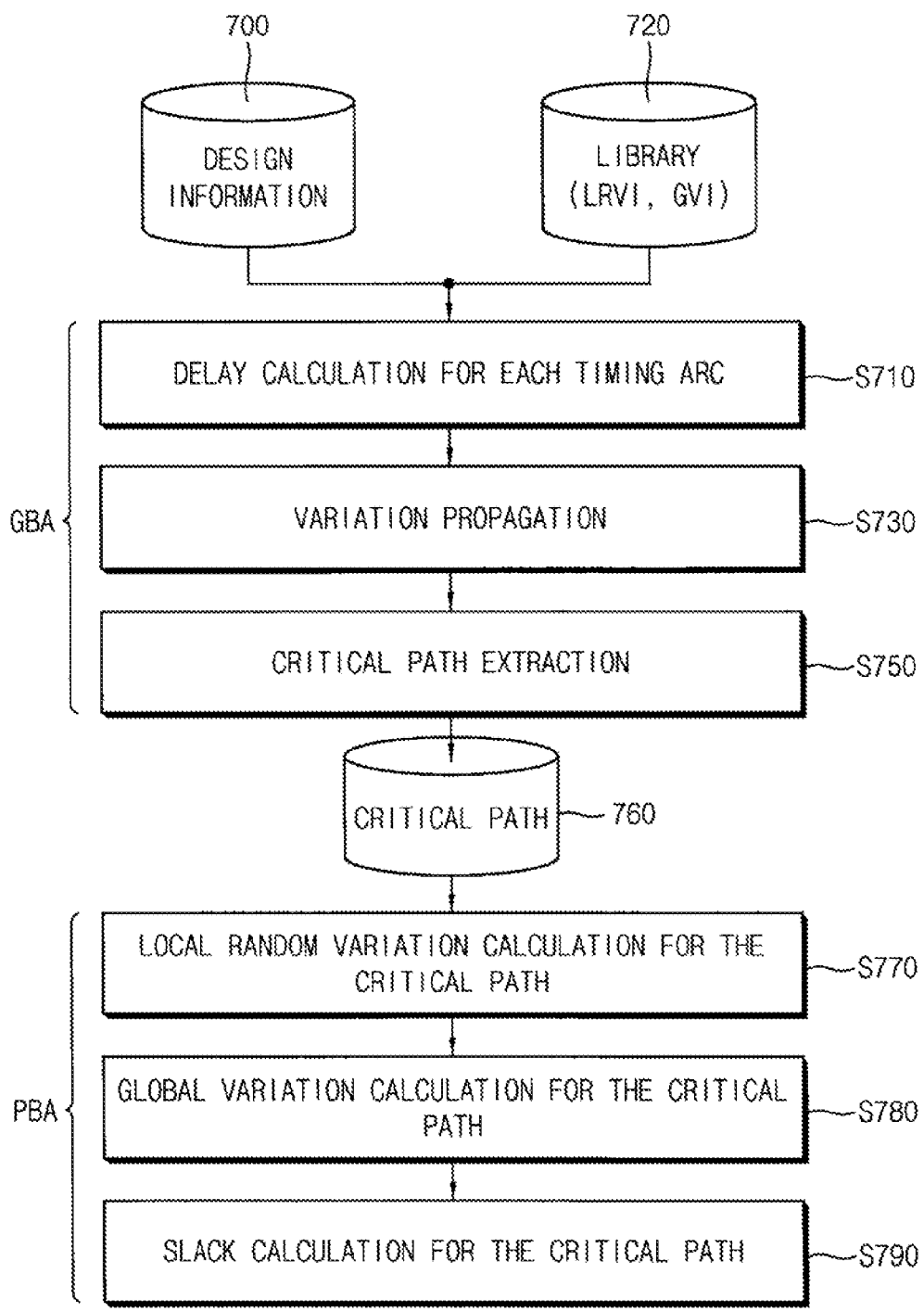
FIG. 7 is a flow chart that illustrates a method of performing a static timing analysis on an integrated circuit according to exemplary embodiments.
Figure 8:
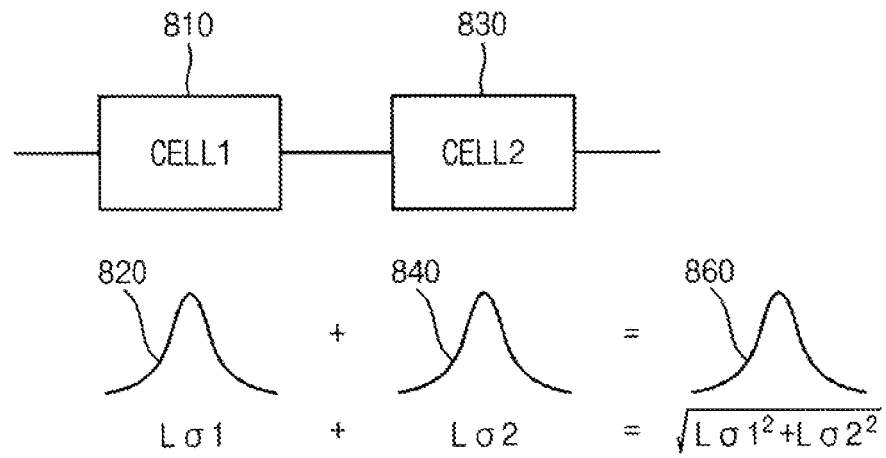
FIG. 8 illustrates a local random variation propagation.
Figure 9:
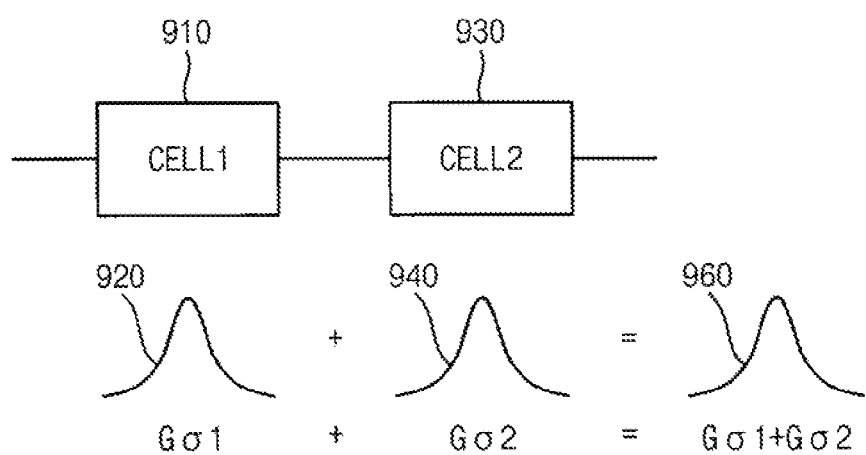
FIG. 9 illustrates a global variation propagation.
Figure 10:
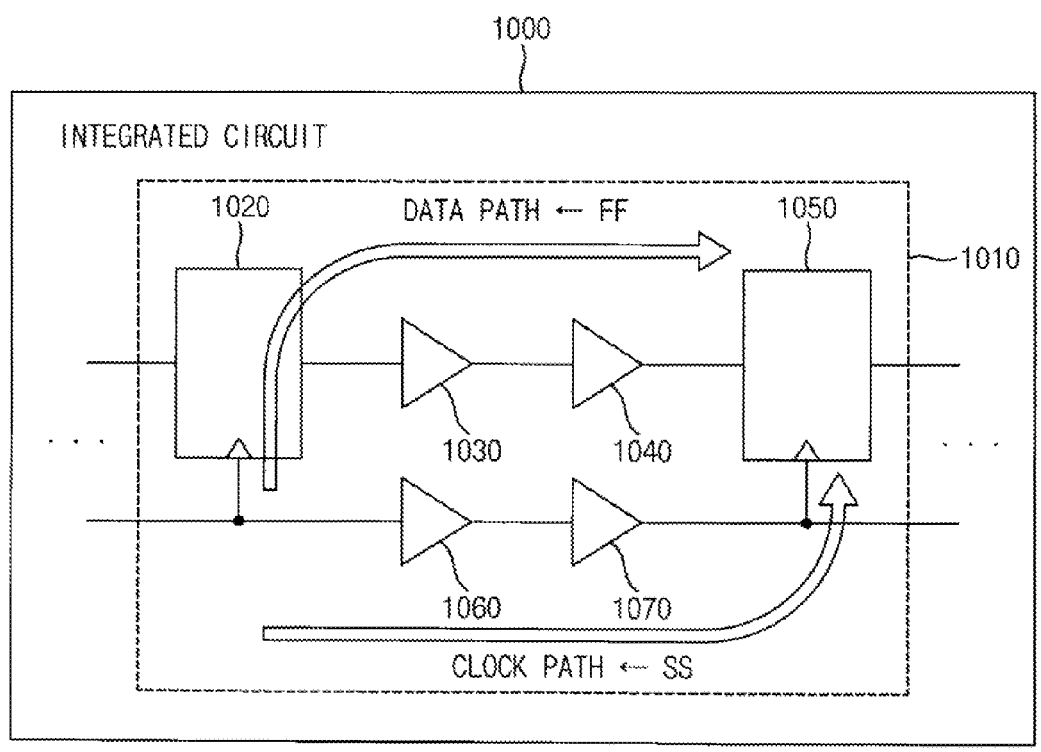
FIG. 10 illustrates a slack calculation by a graph based analysis (GBA).
Figure 11:
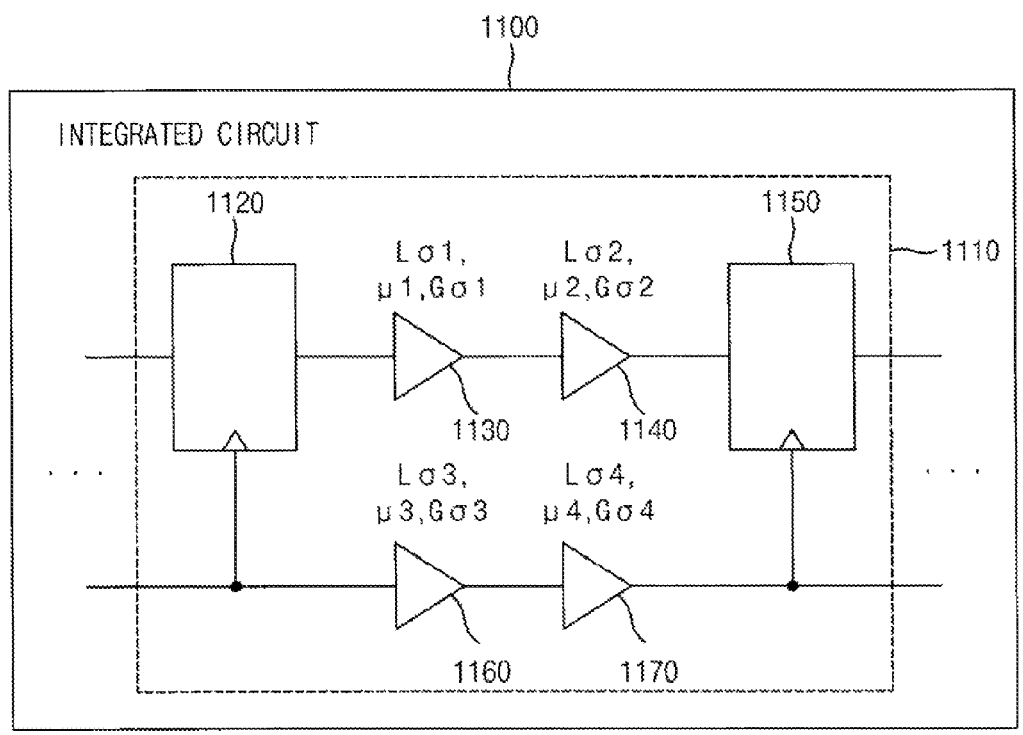
FIG. 11 illustrates a slack calculation by a path based analysis (PBA).

FIG. 7 is a flow chart that illustrates a method of performing a static timing analysis on an integrated circuit according to exemplary embodiments, FIG. 8 illustrates a local random variation propagation, FIG. 9 illustrates a global variation propagation, FIG. 10 illustrates a slack calculation by a graph based analysis (GBA), and FIG. 11 illustrates a slack calculation by a path based analysis (PBA).

Referring to FIG. 7, in a method of performing a static timing analysis on an integrated circuit according to exemplary embodiments, design information 700 and a library 720 are loaded. For example, the design information 700 includes a netlist, parasitic data information and/or timing constraint information. The library 720 includes local random variation information LRVI and global variation information GVI with respect to cells or timing arcs of the cells included in the integrated circuit. In some exemplary embodiments, the library 720 further includes delay information, function definitions, power information, noise information, etc., for the cells. The global variation information GVI includes global variation values obtained based on a set of a plurality of global variation parameters for at least two timing corners of the integrated circuit.

In a method of performing a static timing analysis according to exemplary embodiments, a graph based analysis (GBA) is performed to extract at least one critical path 760 from timing paths included in the integrated circuit (S710, S730 and S750), and then a path based analysis (PBA) is performed to determine whether the critical path 760 violates a timing constraint (S770, S780 and S790).

To perform a GBA, a delay, such as a nominal delay, of each timing arc included in the integrated circuit is calculated (S710). The delay of each timing arc can be calculated based on the library 720, which includes the delay information of each timing arc according to input slews and output loads.

Further, a local random variation LRVP value of each timing path can be calculated by propagating a local random variation on the timing path included in the integrated circuit, and a global variation GVP value of each timing path can be calculated by propagating a global variation on the timing path included in the integrated circuit (S730).

For example, the local random variation information LRVI of the library 720 includes local random variation LRVA values of the timing arcs included in the integrated circuit, and the local random variation LRVP value of the timing path can be calculated from a root-sum-square (RSS) of the local random variation LRVA values of the timing arcs included in the timing path. For example, as illustrated in FIG. 8, if the timing path includes a first cell 810 having a first local random variation value $L\sigma 1$ and a second cell 830 having a second local random variation value $L\sigma 2$, the local random variation LRVP value of the timing path can be calculated as a root-sum-square (RSS) of the first local random variation value $L\sigma 1$ and the second local random variation value $L\sigma 2$ because there is essentially no correlation between the local random variation LRVA values $L\sigma 1$ and $L\sigma 2$ of the cells 810 and 830 or the timing arcs within the integrated circuit, i.e., the correlation is about 0.

For example, the global variation information GVI of the library 720 includes global variation GVA values of the timing arcs included in the integrated circuit, and the global variation GVP value of the timing path can be calculated by calculating a linear sum of the global variation GVA values of the timing arcs included in the timing path. For example, as illustrated in FIG. 9, if the timing path includes a first cell 910 having a first global variation value $G\sigma 1$ and a second cell 930 having a second global variation value $G\sigma 2$, the global variation GVP value of the timing path can be calculated as a (linear) sum of the first global variation value $G\sigma 1$ and the second global variation value $G\sigma s$ because the global variation GVA values $G\sigma 1$ and $G\sigma 2$ of the cells 910 and 930 or the timing arcs within the integrated circuit are essentially completely correlated, i.e., the correlation is about 1.

A statistical sum of the local random variation value of the timing path and the global variation value of the timing path can be calculated to determine a total variation TVP value of the timing path, and whether the timing path is the critical path 760 can be determined based on the delays of the timing arcs included in the timing path and the total variation TVP value of the timing path (S750). For example, the total variation TVP value of the timing path can be calculated as a root-square-sum (RSS) of the local random variation LRVP value of the timing path and the global variation GVP value of the timing path. Whether the timing path is the critical path 760 can be determined by calculating a slack of the timing path based on the delays of the timing arcs included in the timing path and the total variation TVP value of the timing path. For example, if the slack of the timing path has a negative value, it is determined that the timing path is the critical path 760.

In some exemplary embodiments, in performing the GBA, the slack of the timing path or the global variation value of the timing path can be calculated with pessimism. For example, if the timing path includes a data path and a clock path, the global variation value of the timing path can be calculated by applying the global variation values of the timing arcs at a fast corner (FF) of the integrated circuit with respect to one of the data path and the clock path, and by applying the global variation values of the timing arcs at a slow corner (SS) of the integrated circuit with respect to the other of the data path and the clock path.

For example, as illustrated in FIG. 10, a timing path 1010 between first and second flip-flops 1020 and 1050 in an integrated circuit 1000 includes a data path having first and second buffers 1030 and 1040, and a clock path having third and fourth buffers 1060 and 1070. In calculating a hold slack of the timing path 1010 to perform the GBA with pessimism, the global variation values at the fast corner FF can be applied with respect to the data path, and the global variation values at the slow corner SS can be applied with respect to the clock path. For example, since the global variation values at the fast corner FF are applied to the data path, and the global variation values at the slow corner SS are applied to the clock path, a hold slack SLACK_WGVAR of the timing path 1010 with the worst global variation can be calculated by subtracting a delay CPATH@SS of the clock path with the global variation values at the slow corner SS from a delay DPATH@FF of the data path with the global variation values at the fast corner SS. Further, a total local random variation value TOT_LVAR of the timing path 1010 can be calculated by calculating a statistical sum or a root-sum-square RSS(N×LRD, N×LRC) of a first product N×LRD of a 1-sigma (standard deviation) local random variation value LRD calculated by the local random variation propagation at the data path and the required signal level N for the local random variation and a second product N×LRC of a 1-sigma (standard deviation) local random variation value LRC calculated by the local random variation propagation at the clock path and the required signal level N for the local random variation. Finally, the hold slack (SLACK BY GBA) of the timing path 1010 based on the GBA can be calculated by subtracting the total local random variation value TOT_LVAR of the timing path 1010 from the hold slack SLACK_WGVAR of the timing path 1010 with the worst global variation.

In another example, to calculate a setup slack of the timing path 1010 with pessimism, the global variation values at the slow corner SS are applied to the data path, and the global variation values at the fast corner FF are applied to the clock path. Thus, although the data path and the clock path within the same integrated circuit 1000 have the same global variation, the (hold or setup) slack can be calculated with pessimism using the global variation values at different timing corners with respect to the data path and the clock path.

By performing the GBA (S710, S730 and S750), the (hold or setup) slack of the timing path may be calculated. Further, if the slack of the timing path has a negative value, the timing path is determined as the critical path 760.

The PBA is performed on the critical path 760 (S770, S780 and S790). For example, a local random variation value of the critical path 760 can be calculated by calculating a root-sum square of local random variation values of the timing arcs included in the critical path 760 (S770). For example, as illustrated in FIG. 11, if a timing path 1110 between first and second flip-flops 1120 and 1150 within an integrated circuit 1100 is the critical path, and since the local random variation values between respective cells or timing arcs are not correlated, a local random variation value of the critical path 1110 can be calculated by calculating a root-sum-square of local random variation values of the cells 1130, 1140, 1160 and 1170 of the timing arcs included in the critical path 1110.

A worst global variation value of the critical path 760 can be calculated by respectively calculating slacks of the critical path 1110 at a plurality of timing corners, such as the SS, FF, FS, SF and NN corners, of the integrated circuit (S780). In calculating the respective slacks of the critical path 760 at the plurality of timing corners SS, FF, FS, SF and NN, the local random variation are not considered. For example, a minimum of the respective slacks of the critical path 760 may be selected, and the worst global variation value of the critical path 760 can be calculated by subtracting the minimum of the respective slacks from a slack of the critical path 760 at a nominal corner NN of the integrated circuit. In an example illustrated in FIG. 11, the respective slacks SLACK@CORNERS of the critical path 1110 at the plurality of timing corners {SS, FS, SF, FF, NN} are calculated. For example, a hold slack of the critical path 1110 at each timing corner can be calculated by subtracting a delay, such as $\mu 3+\mu 4+G\sigma 3+G\sigma 4$, of a clock path at the timing corner from a delay, such as $\mu 1+\mu 2+G\sigma 1+G\sigma 2$, of a data path at the timing corner. The worst global variation value of the critical path 1110 can be calculated by subtracting the minimum MIN(SLACK@CORNERS) of the respective slacks SLACK@CORNERS of the critical path 760 at the plurality of timing corners ({SS, FS, FS, SF, NN} from the slack SLACK@NN at the nominal corner NN.

A worst total variation value of the critical path 760 can be calculated by calculating a statistical sum or a root-sum-square of the local random variation value of the critical path 760 and the worst global variation value of the critical path 760. In some exemplary embodiments, as illustrated in FIG. 11, the local random variation value LRV and the worst global variation value WGV have a 1-sigma standard deviation, and the worst total variation value of the critical path 1110 can be calculated by calculating the statistical sum or the root-sum-square RSS(N×LRV, M×WGV) of a first product N×LRV of the local random variation value LRV and a required signal level N, and a second product M×WGV of the worst global variation value WGV and a required signal level M.

Whether the critical path 760 violates a timing constraint is determined based on the delays of the timing arcs included in the critical path 760 and the statistical sum, i.e., the worst total variation value, of the local random variation value and the worst global variation value (S790). For example, a worst slack of the critical path 760 can be calculated based on the delays of the timing arcs included in the critical path 760 and the statistical sum of the local random variation value and the worst global variation value. If the worst slack of the critical path 760 has a negative value, it is decided that the critical path 760 violates the timing constraint. In an example illustrated in FIG. 11, the worst (hold) slack of the critical path 1110 can be calculated by subtracting the worst total variation value from a nominal (hold) slack, such as $\mu 1+\mu 2-\mu 3-\mu 4$, of the critical path 1110, and, if the worst (hold) slack of the critical path 1110 has a negative value, it is decided that the critical path 1110 violates the timing constraint.

As described above, in a method of performing a static timing analysis according to exemplary embodiments, the global variation information GVI can be obtained or characterized based on the set of the plurality of global variation parameters, and thus the time required for the library development and/or the time required for the static timing analysis can be reduced. Further, in a method of performing a static timing analysis according to exemplary embodiments, the GBA and the PBA can be performed based on the global variation information GVI, which can improve the accuracy and the coverage of the static timing analysis.

Figure 12:
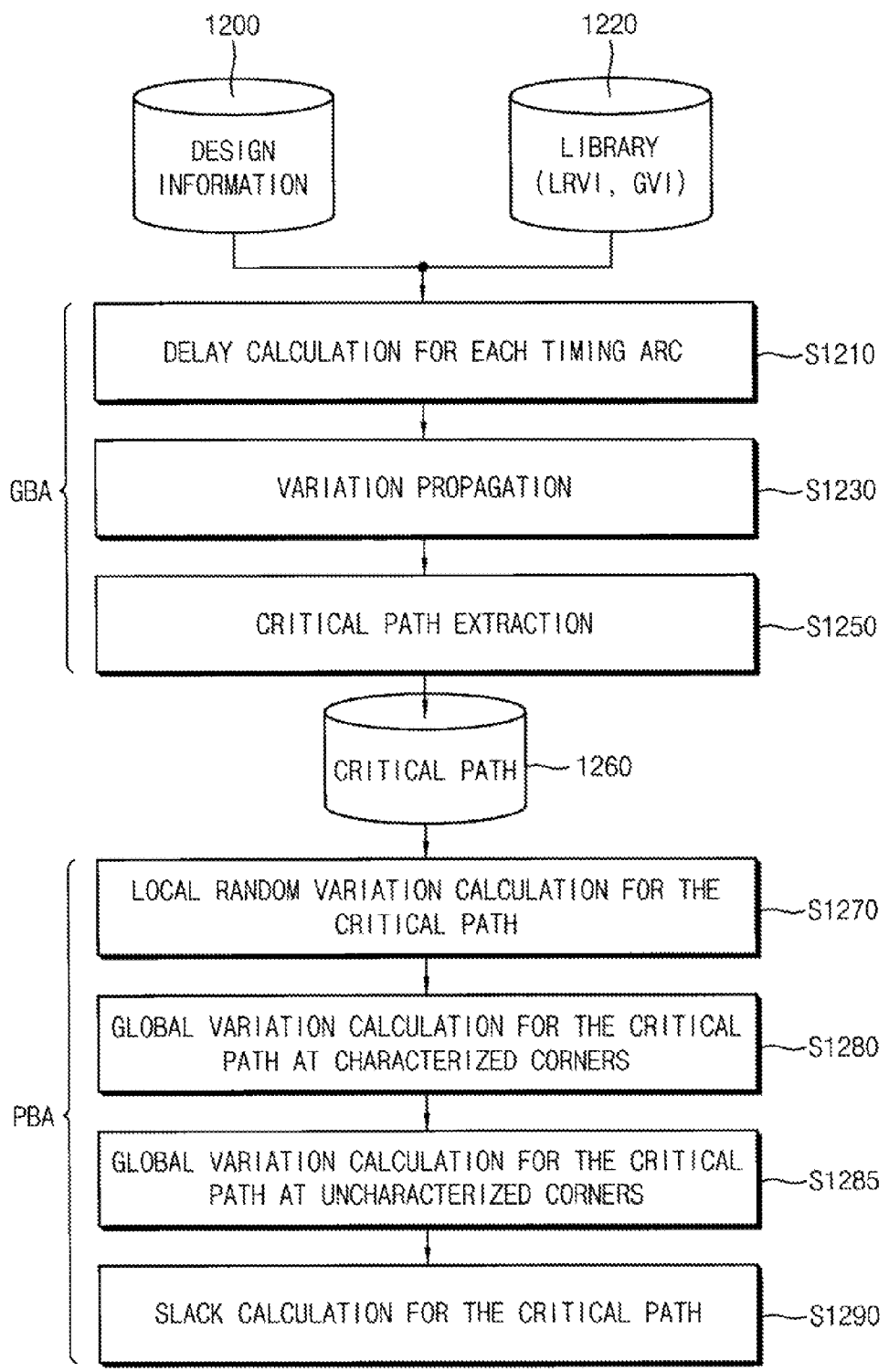
FIG. 12 is a flow chart that illustrates a method of performing a static timing analysis on an integrated circuit according to exemplary embodiments.

FIG. 12 is a flow chart that illustrates a method of performing a static timing analysis on an integrated circuit according to exemplary embodiments, and FIG. 13 illustrates an example where an uncharacterized global variation value is calculated based on a characterized global variation value.

Referring to FIG. 12, in a method of performing a static timing analysis on an integrated circuit according to exemplary embodiments, design information 1200 and a library 1220 are loaded. In the method, a graph based analysis (GBA) is performed to extract at least one critical path 1260 from timing paths included in the integrated circuit (S1210, S1230 and S1250), and then a path based analysis (PBA) is performed to determine whether the critical path 1260 violates a timing constraint (S1270, S1280, S1285 and S1290). Compared with a method of performing a static timing analysis illustrated in FIG. 12 is similar to a method of performing a static timing analysis illustrated in FIG. 7, except that the method of FIG. 12 further calculates a global variation value at an uncharacterized timing corner (S1285). Thus, a repeated description of similar steps in FIG. 12 is omitted.

For example, in calculating a worst global variation value of the critical path 1260, global variation values of the critical path 1260 at a plurality of timing corners included in global variation information GVI of a library 1220 can be calculated (S1280), and a global variation value at at least one timing corner not included in the global variation information GVI of the library 1220 is further calculated based on the global variation values at the plurality of timing corners included in the global variation information GVI of the library 1220 (S1285).

For example, as illustrated in FIG. 13, although a plurality of integrated circuits can be manufactured by a same process, the integrated circuits can have an operating speed distribution 1310 due to operating speeds of N-type and P-type FETs, and the library 1220 includes, as the global variation information GVI, global variation values at the plurality of timing corners (e.g., SS, FF, SF and FS). In some exemplary embodiments, the library 1220 includes, as the global variation information GVI, global variation values that are scaled to a 1-sigma standard deviation level. In an example illustrated in FIG. 13, the operating speed distribution 1310 may have a 3-sigma standard deviation level, and an operating speed distribution 1320*a* is the operating speed distribution 1310 scaled to a 1-sigma standard deviation level. Further, an operating speed distribution 1320*b* is a rotated version of the operating speed distribution 1320*a*. In the example illustrated in FIG. 13, even if a global variation value GV@NF at an NF corner is not characterized, the global variation value GV@NF at the NF corner can be calculated based on a characterized global variation value GV@SF at an SF corner and a characterized global variation value GV@FF at an FF corner, for example, by using the equation (GV@SF+GV@FF)/2. Further, even if a global variation value GV@NF' at an NF' corner is not characterized, the global variation value GV@NF' at the NF' corner can be calculated based on the calculated global variation value GV@NF at the NF corner and the characterized global variation value GV@FF at the FF corner, for example, by using the equation (GV@NF+GV@FF)/2.

A maximum of the global variation values at the timing corners included in the global variation information GVI and the global variation value at the timing corner not included in the global variation information GVI can be determined to be a worst global variation value of the critical path 1260. As described above, in a method of performing a static timing analysis according to exemplary embodiments, not only the global variation values (or slacks) at the characterized timing corners, but also the global variation value (or a slack) at the uncharacterized timing corner may be calculated, and thus the accuracy of the static timing analysis can be further improved.

Figure 14:
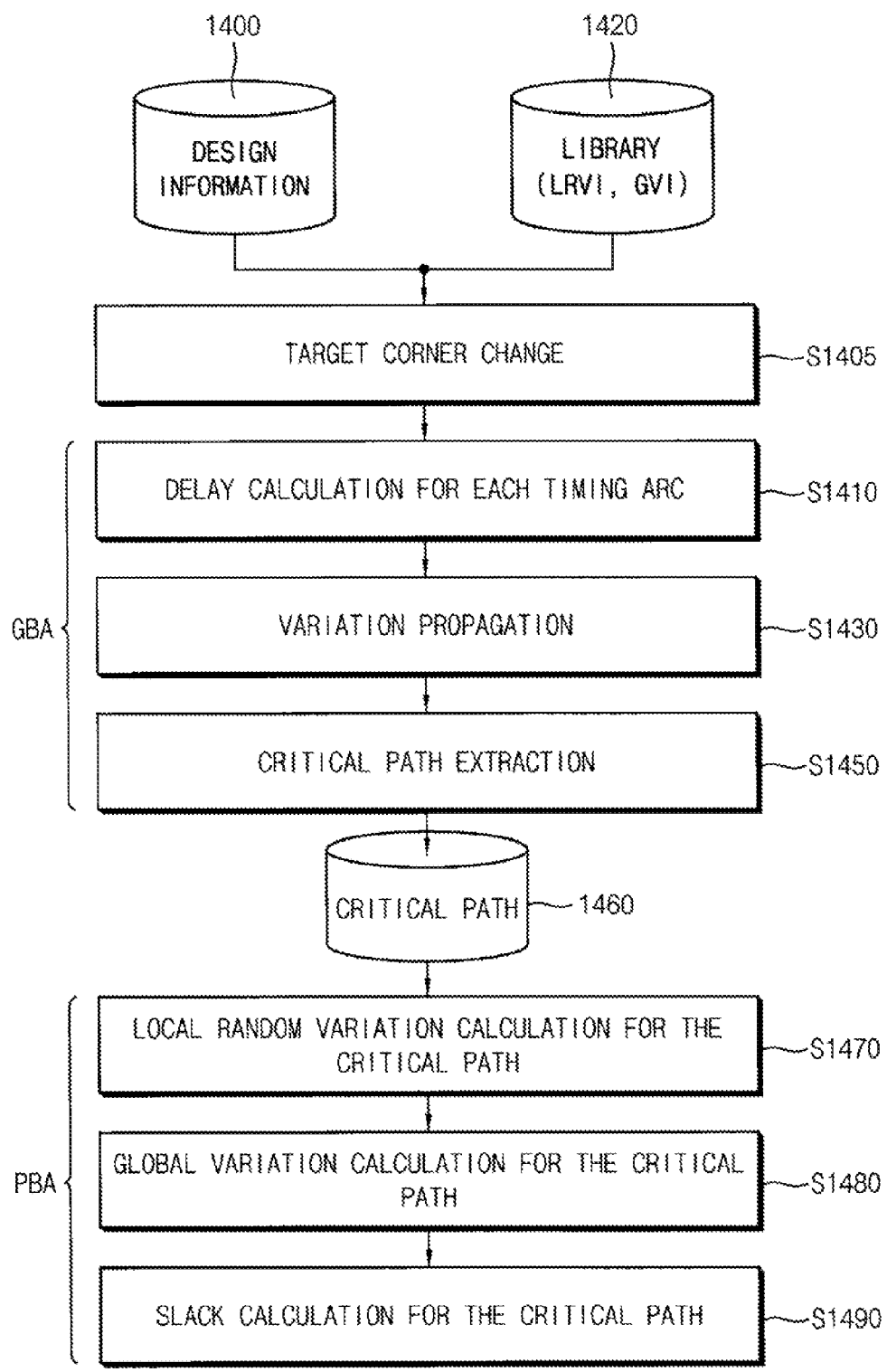
FIG. 14 is a flow chart that illustrates a method of performing a static timing analysis on an integrated circuit according to exemplary embodiments.
Figure 15:
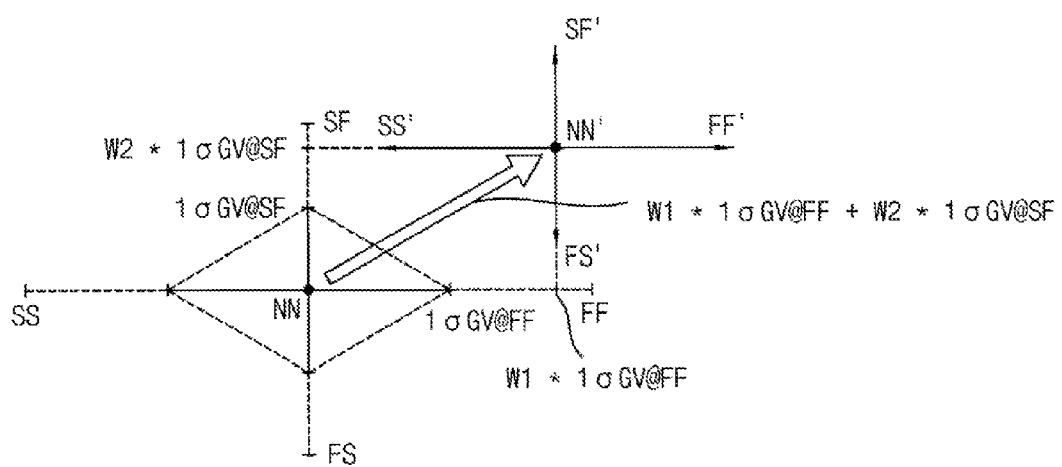
FIG. 15 illustrates an example where a nominal corner is changed based on a characterized global variation value.

FIG. 14 is a flow chart that illustrates a method of performing a static timing analysis on an integrated circuit according to exemplary embodiments, and FIG. 15 illustrates an example where a nominal corner is changed based on a characterized global variation value.

Referring to FIG. 14, in a method of performing a static timing analysis on an integrated circuit according to exemplary embodiments, design information 1400 and a library 1420 are loaded. In the method, a graph based analysis (GBA) is performed to extract at least one critical path 1460 from timing paths included in the integrated circuit (S1410, S1430 and S1450), and then a path based analysis (PBA) is performed to determine whether the critical path 1460 violates a timing constraint (S1470, S1480 and S1490). A method of performing static timing analysis illustrated in FIG. 14 is similar to a method of performing a static timing analysis illustrated in FIG. 7, except that the method of FIG. 14 further performs a target corner change, or a nominal (NN) corner change (S1405). Thus, a repeated description of similar steps in FIG. 14 is omitted.

If a process condition or a process environment has changed, a target corner or a nominal (NN) corner may change. In a conventional static timing analysis, a library characterization should be performed at the new target corner or the new nominal (NN) corner. However, in a method of performing a static timing analysis according to exemplary embodiments, the target corner or the nominal (NN) corner may change based on global variation values for at least two timing corners included in global variation information GVI of the library 1420 (S1405). For example, as illustrated in FIG. 15, in a case where an NN corner should be changed to an NN' corner, a delay at the NN' corner may be calculated by calculating a sum of a first product W1×1σGV@FF of a 1-sigma standard deviation global variation value 1σGV@FF at an FF corner included in the global variation information GVI and a predetermined weight W1, and a second product W2×1σGV@SF of a 1-sigma standard deviation global variation value 1σGV@SF at an SF corner included in the global variation information GVI and a predetermined weight W2. Further, the GBA can be performed at the NN' corner (S1410, S1430 and S1450), and then the PBA can be performed at the NN' corner (S1470, S1480 and S1490). Accordingly, even if the library characterization is not performed at the NN' corner, the static timing analysis can be performed at the NN' corner.

Figure 16:
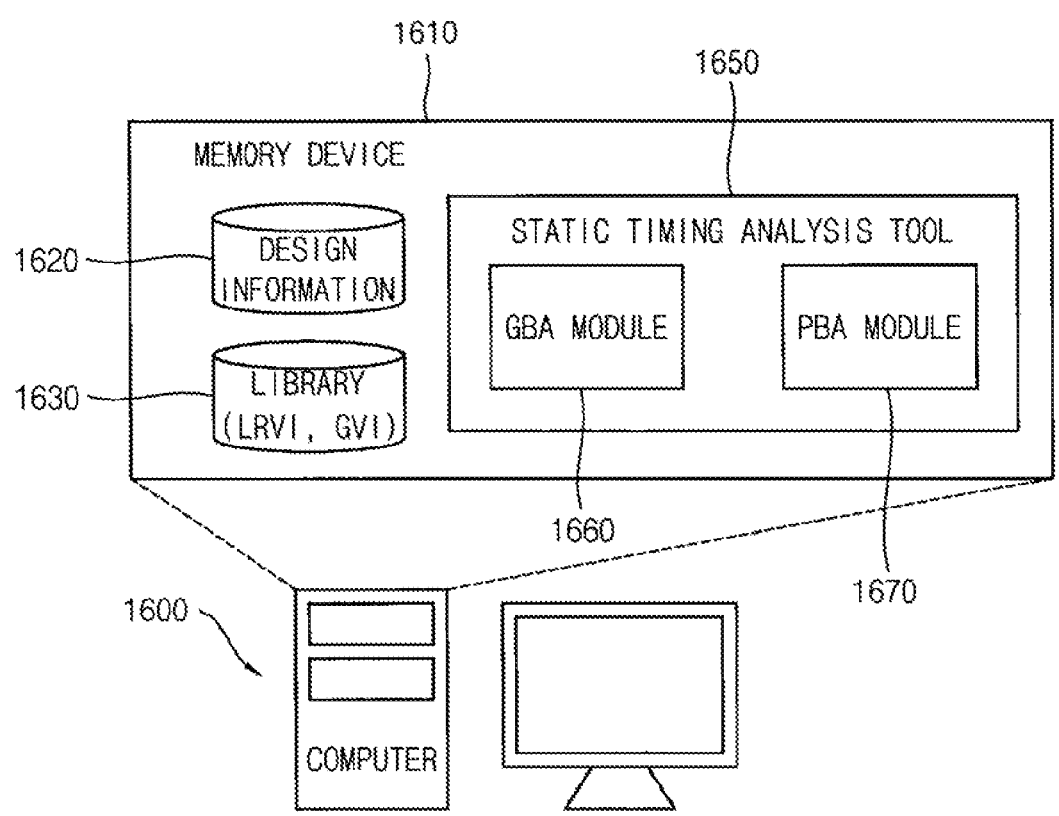
FIG. 16 illustrates a computing system that performs a static timing analysis on an integrated circuit according to exemplary embodiments.

FIG. 16 illustrates a computing system that performs a static timing analysis on an integrated circuit according to exemplary embodiments.

Referring to FIG. 16, a computing system 1600 for performing a static timing analysis on an integrated circuit, such as a system-on-chip (SoC), includes a processor and a memory device 1610. The processor can load design information 1620 for the integrated circuit and a library 1630 into the memory device 1610. For example, the library 1630 includes local random variation information LRVI of the integrated circuit and global variation information GVI obtained based on a set of a plurality of global variation parameters of the integrated circuit. For example, the global variation information GVI of the library 1630 includes global variation values obtained based on the set of the global variation parameters for at least two timing corners of the integrated circuit. The processor can further load a static timing analysis tool 1650 into the memory device 1610, and can execute the static timing analysis tool 1650 loaded into the memory device 1610.

The static timing analysis tool 1650 can perform a static timing analysis on the integrated circuit. The static timing analysis tool 1650 includes a graph based analysis (GBA) module 1660 and a path based analysis (PBA) module 1670.

The GBA module 1660 can perform the GBA to extract at least one critical path from timing paths included in the integrated circuit based on the local random variation information LRVI and the global variation information GVI. The GBA module 1660 can calculate a local random variation value at each timing path by performing a local random variation propagation on the timing path, can calculate a global variation value at each timing path by performing a global variation propagation on the timing path, can calculate a statistical sum of the local random variation value of the timing path and the global variation value of the timing path, and can determine whether the timing path is a critical path based on the statistical sum of the local random variation value and the global variation value. In some exemplary embodiments, the GBA module 1660 can calculate the global variation value of the timing path with pessimism.

The PBA module 1670 can perform the PBA to determine whether the critical path violates a timing constraint. For example, the PBA module 1670 can calculate a local random variation value of the critical path by calculating a root-sum-square of local random variation values of timing arcs included in the critical path, can calculate a worst global variation value of the critical path by calculating respective slacks of the critical path at a plurality of timing corners of the integrated circuit, can calculate a statistical sum of the local random variation value of the critical path and the worst global variation value of the critical path, and can determine whether the critical path violates the timing constraint based on the statistical sum of the local random variation value and the worst global variation value.

As described above, the computing system 1600 that performs a static timing analysis according to exemplary embodiments can use the global variation information GVI obtained or characterized based on the set of the plurality of global variation parameters, which can reduce the time required for library development and/or the time required for the static timing analysis. Further, the accuracy and the coverage of the static timing analysis can be improved.

Embodiments of the inventive concept can be applied to any semiconductor timing analysis tool, device, system and method. For example, embodiments of the inventive concept can be applied to a timing analysis tool or device for a system-on-chip.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and features of the embodiments of the present inventive concept. Accordingly, all such modifications are intended to be included within the scope of the present inventive concept as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A method of manufacturing an integrated circuit by performing a static timing analysis on the integrated circuit, the method comprising:
   loading, by a processor, a library that includes local random variation information of the integrated circuit and global variation information of the integrated circuit that is obtained based on a set of a plurality of global variation parameters of the integrated circuit;
   calculating, by a static timing analysis tool, delays of timing arcs included in the integrated circuit based on the library;
   determining, by the static timing analysis tool, whether at least one timing path of a plurality of timing paths included in the integrated circuit violates a timing constraint based on the delays of the timing arcs in the at least one timing path, the local random variation information of the integrated circuit and the global variation information of the integrated circuit; and
   manufacturing the integrated circuit based on an integrated circuit design optimized using a result of the determination of violation of the timing constraint.

2. The method of claim 1, wherein the global variation information of the library includes global variation values for at least two timing corners of the integrated circuit based on the set of the plurality of global variation parameters of the integrated circuit.

3. The method of claim 1, wherein determining whether the at least one timing path violates the timing constraint includes calculating a slack of the at least one timing path based on the delays of the timing arcs included in the at least one timing path and a statistical sum of a local random variation value of the at least one timing path and a global variation value of the at least one timing path.

4. The method of claim 1, wherein determining whether at least one timing path violates the timing constraint includes:
   performing, by a graph based analysis (GBA) module, a GBA to extract a critical path from the plurality of timing paths included in the integrated circuit; and
   performing, by a path based analysis (PBA) module, a PBA to determine whether the critical path violates the timing constraint.

5. The method of claim 4, wherein performing the GBA includes:
   calculating a local random variation value of each timing path in the integrated circuit by propagating a local random variation on each timing path;
   calculating a global random variation value of each timing path in the integrated circuit by propagating a global variation on each timing path;
   calculating a total random variation value of each timing path from a statistical sum of the local random variation value of each timing path and the global random variation value of each timing path; and
   determining whether a timing path is the critical path based on the delays of the timing arcs included in each timing path and the total random variation value of each timing path.

6. The method of claim 5, wherein the local random variation information includes local random variation values of the timing arcs, and
   the local random variation value of each timing path is calculated from a root-sum-square of the local random variation values of the timing arcs included in each timing path.

7. The method of claim 5, wherein the global variation information includes global variation values of the timing arcs, and
   the global variation value of each timing path is calculated from a linear sum of the global variation values of the timing arcs included in each timing path.

8. The method of claim 7, wherein one of the plurality of timing path includes a data path and a clock path, and wherein the global variation value of the one timing path is calculated by applying the global variation values of the timing arcs at a fast corner of the integrated circuit with respect to one of the data path and the clock path, and by applying the global variation values of the timing arcs at a slow corner of the integrated circuit with respect to another one of the data path and the clock path.

9. The method of claim 5, wherein the statistical sum of the local random variation value of each timing path and the global random variation value of each timing path includes a root-sum-square of the local random variation value of each timing path and the global random variation value of each timing path.

10. The method of claim 4, wherein performing the PBA includes:
calculating a local random variation value of the critical path by calculating a root-sum-square of local random variation values of the timing arcs included in the critical path;
calculating a worst global variation value of the critical path by calculating respective slacks of the critical path at a plurality of timing corners and a nominal corner of the integrated circuit;
calculating a worst total variation of the critical path from a statistical sum of the local random variation value of the critical path and the worst global variation value of the critical path; and
determining whether the critical path violates the timing constraint based on the delays of the timing arcs included in the critical path and the worst total variation of the critical path.

11. The method of claim 10, wherein calculating the worst global variation value of the critical path includes:
calculating the respective slacks of the critical path at the plurality of timing corners;
selecting a minimum of the calculated slacks of the critical path; and
calculating the worst global variation value of the critical path by subtracting the minimum of the calculated slacks of the critical path from a slack of the critical path at the nominal corner of the integrated circuit.

12. The method of claim 10, wherein determining whether the critical path violates the timing constraint includes:
calculating a worst slack of the critical path based on the delays of the timing arcs included in the critical path and the worst total variation of the critical path; and
deciding that the critical path violates the timing constraint when the worst slack of the critical path has a negative value.

13. The method of claim 10, wherein calculating the worst global variation value of the critical path includes:
calculating global variation values of the critical path at the timing corners included in the global variation information;
calculating a global variation value for at least one timing corner not included in the global variation information based on the global variation values of the critical path for at least two of the timing corners included in the global variation information; and
selecting, as the worst global variation value of the critical path, a maximum of the global variation values of the critical path at timing corners included in the global variation information and the global variation value at the timing corner not included in the global variation information.

14. The method of claim 4, further comprising:
changing, by the static timing analysis tool, a nominal corner of the integrated circuit based on global variation values of at least two timing corners included in the global variation information, wherein the graph based analysis (GBA) is performed at the changed nominal corner, and the path based analysis (PBA) is performed at the changed nominal corner.

15. A method of manufacturing an integrated circuit by performing a static timing analysis on the integrated circuit, the method comprising:
loading, by a processor, a library including local random variation information of the integrated circuit and global variation information of the integrated circuit that is obtained based on a set of a plurality of global variation parameters of the integrated circuit;
performing, by a graph based analysis (GBA) module, a GBA to extract a critical path from a plurality of timing paths included in the integrated circuit based on the local random variation information and the global variation information;
performing, by a path based analysis (PBA) module, a PBA to determine whether the critical path violates a timing constraint; and
manufacturing the integrated circuit based on an integrated circuit design optimized using a result of the determination of violation of the timing constraint.

16. The method of claim 15, further comprising:
characterizing, by a static timing analysis tool, a delay of each timing arc in each cell included in the integrated circuit, wherein the delays are stored in the library;
obtaining, by the static timing analysis tool, local random variation values of each timing arc in each cell included in the integrated circuit by performing a simulation by varying local random variation parameters with respect to transistors included in each timing arc; and
obtaining, by the static timing analysis tool, global variation values of each timing arc in each cell included in the integrated circuit by varying a set of a plurality of global variation parameters for at least two timing corners of the integrated circuit in a simulation,
wherein the local random variation values and the global variation values of each timing arc in each cell are stored in the library for the integrated circuit.

17. The method of claim 15, wherein performing the GBA includes:
calculating a local random variation value of each timing path included in the integrated circuit from a root-sum-square of local random variation values of timing arcs included in each timing path;
calculating a global random variation value of each timing path included in the integrated circuit from a linear sum of global variation values of the timing arcs included in each timing path;
calculating a total random variation value of each timing path included in the integrated circuit from a root-sum-square of the local random variation value of each timing path and the global random variation value of each timing path; and
determining whether each timing path is the critical path based on the delays of the timing arcs included in each timing path and the total random variation value of each timing path.

18. The method of claim 15, wherein performing the PBA includes:

calculating a local random variation value of the critical path by calculating a root-sum-square of local random variation values of the timing arcs included in the critical path;

calculating a worst global variation value of the critical path by subtracting a minimum of respective slacks of the critical path at a plurality of timing corners from a slack of the critical path at a nominal corner of the integrated circuit;

calculating a worst total variation of the critical path from a statistical sum of the local random variation value of the critical path and the worst global variation value of the critical path; and determining whether the critical path violates the timing constraint based on the delays of the timing arcs included in the critical path and the worst total variation of the critical path.

19. A method of manufacturing an integrated circuit by performing a static timing analysis on the integrated circuit, the method comprising:

loading, by a processor, a library that includes local random variation information of the integrated circuit and global variation information of the integrated circuit that is obtained based on a set of a plurality of global variation parameters of the integrated circuit;

calculating, by a static timing analysis tool, delays of timing arcs included in the integrated circuit based on the library;

calculating, by the static timing analysis tool, a slack of a timing path included in the integrated circuit based on the delays of the timing arcs included in the timing path and a statistical sum of a local random variation value of the timing path and a global variation value of the timing path;

deciding, by the static timing analysis tool, that the timing path violates a timing constraint when the slack of the timing path has a negative value; and manufacturing the integrated circuit based on an integrated circuit design optimized using a result of the decision of violation of the timing constraint.

* * * * *